US005847852A

United States Patent [19]
Domon et al.

[11] Patent Number: 5,847,852
[45] Date of Patent: Dec. 8, 1998

[54] OPTICAL NETWORK

[75] Inventors: Wataru Domon; Makoto Shibutani, both of Tokyo, Japan

[73] Assignee: NEC Corporation, Tokyo, Japan

[21] Appl. No.: 811,906

[22] Filed: Mar. 5, 1997

Related U.S. Application Data

[62] Division of Ser. No. 573,321, Dec. 15, 1995, abandoned.

[30] Foreign Application Priority Data

Dec. 15, 1994 [JP] Japan .................................. 6-311691

[51] Int. Cl.$^6$ .................................................. H04B 10/20
[52] U.S. Cl. ........................ 359/118; 359/125; 359/174; 359/167
[58] Field of Search ................................. 359/119, 120, 359/121, 123, 125, 133, 164, 174, 178, 179, 667; 370/403, 404, 405, 406

[56] References Cited

U.S. PATENT DOCUMENTS

| | | | |
|---|---|---|---|
| 4,731,784 | 3/1988 | Keller et al. | 359/119 |
| 4,759,011 | 7/1988 | Hicks, Jr. | 359/119 |
| 5,073,982 | 12/1991 | Viola et al. | 359/120 |
| 5,077,727 | 12/1991 | Suzuki | 359/123 |
| 5,189,414 | 2/1993 | Tawara | 359/178 |
| 5,210,632 | 5/1993 | Murakami et al. | 359/178 |
| 5,321,540 | 6/1994 | Takai et al. . | |
| 5,521,732 | 5/1996 | Nishio . | |
| 5,576,875 | 11/1996 | Chawki et al. | 359/119 |
| 5,615,036 | 3/1997 | Emura | 359/125 |

OTHER PUBLICATIONS

M. Shibutani et al., "Optical Transmission Networks for Wide Area Video Monitoring Systems", The Institute of Electronics Information and Communication Engineers, Autumn Meeting, OCS92–25 (1992), pp. 89–96.

A. Hiramatsu et al., "The Concept of A Hyper–Band Network Based on Photonic Wavelength Division Multiplexing", The Institute of Electronics Information and Communication Engineers, Autumn Meeting, SB–5–5 (1994), pp. 583–584.

W. Domon et al., "An Optical Multiple–Access Network Using Subcarrier Multiplexing Repeaters", Technical Report of the Institute of Electronics Information and Communication Engineers, OCS93–99 (1994), pp. 41–46.

M. Misono et al., "Er–Doped Fiber Amplifier for WDM Networks Using Automatic Gain Control", The Institute of Electronics Information and Communication Engineers, Autumn Meeting, B–943 (1994), p. 541.

S. Suzuki et al., "High Density Integrated 1×16 Optical FDM Multi/Demultiplexers Using High–$\Delta$ $SiO_2$–$GeO_2$ Waveguides on Silicon", The Institute of Electronics Information and Communication Engineers, Autumn Meeting, C–257 (1994), p. 258.

W. Domon et al., "SCM Optical Mulitple–Access Networks with Cascaded Optical Modulators," The Institute of Electronics Information and Communication Engineers, Spring Meeting, SB–9–4 (1993), pp. 4–415–416.

K.T. Koai et al., "Simultaneous Optical Amplification, Detection, and Transmission Using In–Line Semiconductor Laser Amplifiers", IEEE Photonics Technology Letters, vol. 4, No 5, (1992), pp. 441–443.

*Primary Examiner*—Rafael Bacares
*Attorney, Agent, or Firm*—Ostrolenk, Faber, Gerb & Soffen, LLP

[57] ABSTRACT

Disclosed is an optical network which has a plurality of subordinate optical networks, each of which being connected with a plurality of optical terminals which function as a transmitter and a receiver of a signal light, wherein multiplexing of transmission signals and demultiplexing of reception signals at the optical terminals are carried out in the subcarrier multiplexing manner; and a main optical network which is connected with the subordinate optical networks, wherein multiplexing of signal lights transmitted from the subordinate optical networks is carried out in the wavelength division multiplexing manner.

9 Claims, 9 Drawing Sheets

30,31,32,33,34,35,36,37,38 OPTICAL TERMINAL 30,31,32,33,34,35,36,37,38 OPTICAL TERMINAL

|  | | CARRIER FREQUENCY | | |
|---|---|---|---|---|
|  | | f1 | f2 | f3 |
| SIGNAL LIGHT WAVELENGTH | λ1 | 30 | 31 | 32 |
|  | λ2 | 33 | 34 | 35 |
|  | λ3 | 36 | 37 | 38 |

30,31,32,33,34,35,36,37,38 OPTICAL TERMINAL 30,31,32 OPTICAL TERMINAL

- 70 OPTICAL RECEIVER
- 81 ELECTRIC MULTIPLEXER
- 90 OPTICAL TRANSMITTER
- 110 ELECTRIC FILTER
- 180 ELECTRIC DEMULTIPLEXER
- 220 NOTCH FILTER 72, 73, 74   OPTICAL RECEIVER
100, 101, 102   OPTICAL FILTER
111, 112, 113   ELECTRIC FILTER
160   FREQUENCY CONVERTER
180, 181, 182   ELECTRIC DEMULTIPLEXER
230, 231, 232   ELECTRIC SWITCH

OPTICAL NETWORK

This is a Division of application Ser. No. 08/573,321, filed Dec. 15, 1995 now abandoned.

FIELD OF THE INVENTION

This invention relates to an optical network which employs the wavelength division multiplexing(WDM) and subcarrier multiplexing(SCM).

BACKGROUND OF THE INVENTION

A multi-access optical network in which information can be transmitted between a plurality of terminals is suggested. In this optical network, the wavelength division multiplexing(WDM) or subcarrier multiplexing(SCM) are used as a manner of multiplexing a plurality of information output from terminals. In a WDM optical network, an individual optical wavelength is assigned to each optical terminal for transmitting signal light, and a desired information can be obtained by selecting a signal light from a plurality of signal lights with wavelengths different with each other. Since the respective signal lights can transmit a large amount of information, the WDM manner can provide a large capacity optical network. On the other hand, in a SCM optical network, an individual electric frequency is assigned to each optical terminal, and a desired information can be obtained by selecting a carrier signal from a plurality of carrier signals with frequencies different with each other which are obtained when a signal light is received. The SCM optical network has advantages that multiplexing of various signals such as a visual signal, a voice signal is easy and it has high compatibility with a wireless communication system, i.e., it has a flexibility as to a network. The SCM optical network is, for example, shown in M. Shibutani et al., "Optical Transmission Networks for Wide Area Video Monitoring Systems", The Institute of Electronics Information and Communication Engineers, Autumn Meeting, OCS92-25(1992).

Further, WDM/SCM hybrid optical network is also suggested. In the optical network, both an optical wavelength and electric frequency are assigned to each terminal. Therefore, multimedia optical network with both a large capacity in the WDM manner and flexibility in the SCM manner can be provided. The WDM/SCM hybrid optical network is, for example, shown in A. Hiramatsu et al., "The Concept of A Hyper-Band Network Based on Photonic Wavelength Division Multiplexing", The Institute of Electronics Information and Communication Engineers, Autumn Meeting, SB-5-5(1994).

However, in the above WDM/SCM hybrid optical network, there is a problem that the number of optical terminals is limited according to the number of optical wavelengths used in the optical network. At present, the number of wavelengths available in the optical network is less than several tens. Therefore, it is difficult to construct a large-scale optical network.

SUMMARY OF THE INVENTION

Accordingly, it is an object of the invention to provide a large-scale and flexible optical network in which many optical terminals can be connected.

According to a first aspect of the invention, an optical network, comprises:

a plurality of subordinate optical networks, each of which being connected with a plurality of optical terminals which function as a transmitter and a receiver of a signal light, wherein multiplexing of transmission signals and demultiplexing of reception signals at the optical terminals are carried out in the subcarrier multiplexing manner; and a main optical network which is connected with the subordinate optical networks, wherein multiplexing of signal lights transmitted from the subordinate optical networks is carried out in the wavelength division multiplexing manner.

A second aspect of the invention is characterized in that: in the optical network in the first aspect of the invention;

the optical terminals of number N (N is a natural number of two or more) which are connected with each of the subordinate optical network are cascaded on a optical fiber transmission line, wherein carrier signals with frequencies different with each other are input to the optical terminals, an optical receiver in an optical terminal number K(K is a natural number of two or more and N or less) receives a signal light transmitted from a optical terminal number K−1, a carrier signal input to the optical terminal number K and a high-frequency signal output from the optical receiver are multiplexed by an electric multiplexer and a high-frequency signal is then applied to an optical transmitter thereby modulating a signal light transmitted from the optical terminal number K.

A third aspect of the invention is characterized in that: in the optical network in the first aspect of the invention;

the plurality of optical terminals which are connected with each of the subordinate optical networks transmits signal lights modulated by carrier signals with frequencies different with each other, and the transmitted signal lights are multiplexed on an optical fiber transmission line.

A fourth aspect of the invention is characterized in that: in the optical network in the first aspect of the invention;

the optical terminals of number N (N is a natural number of two or more) which are connected with each of the subordinate optical network are cascaded on a optical fiber transmission line which is originated from an optical transmitter, wherein each of the optical terminals has an optical modulator in which carrier signals with frequencies different with each other are applied, a signal light transmitted from a first optical terminal is that which is transmitted from the optical transmitter and modulated by the optical modulator, and a signal light transmitted from an optical terminal number K(K is a natural number of two or more and N or less) is that which is transmitted from an optical terminal number K−1 and modulated by the optical modulator.

A fifth aspect of the invention is characterized in that: in the optical network in the first aspect of the invention;

the subordinate optical networks and the main optical network are connected through a repeater node.

A sixth aspect of the invention is characterized in a repeater node for connecting a subordinate optical network and main optical network, comprising:

an optical receiver for receiving a signal light from the subordinate optical network; and an optical transmitter for transmitting a signal light modulated with a high-frequency signal output from the optical receiver to the main optical network;

wherein a wavelength different according to the repeater node is assigned to a signal light transmitted from the optical transmitter.

A seventh aspect of the invention is characterized in a repeater node for connecting a subordinate optical network and main optical network, comprising:

an optical filter for selecting a signal light with a desired wavelength from a plurality of signal lights with wavelengths different with each other which is transmitted from the main optical network;

an optical receiver for receiving the signal light selected by the optical filter;

an electric filter for selecting a carrier signal with a desired frequency from a high-frequency signal output from the optical receiver;

a frequency converter for converting a frequency of the carrier signal selected by the electric filter; and an optical transmitter for transmitting a signal light modulated with a carrier signal output from the frequency converter to the subordinate optical network.

In the first aspect of the invention, a large-scale and flexible optical network in which many optical terminals can be connected can be provided since subordinate optical networks using SCM are placed under a main optical network using WDM.

In the second aspect of the invention, each optical terminal functions as a repeater of a signal light and a multiplexer of carrier signals. Also, a cheap light source can be used since signal lights transmitted from respective optical terminals are not limited as to a wavelength. Further, the level of a signal light can be compensated in respective optical terminals.

In the third aspect of the invention, signal lights transmitted from respective optical terminals are multiplexed on an optical fiber transmission line. Therefore, a trouble in an optical terminal does not affect the other optical terminals.

In the fourth aspect of the invention, respective optical terminals have a common signal light, i.e., only one signal light is transmitted in a subordinate optical network. Therefore, beat noise by an interference of optical signals does not occur.

In the fifth and sixth aspects of the invention, in a repeater node, a signal light transmitted from an optical terminal is converted into that with a wavelength assigned to each subordinate optical network. The repeater node makes it possible to use an optional wavelength in each subordinate optical networks.

In the fifth and seventh aspect of the invention, a carrier signal to be received by each optical terminal is extracted from a signal light transmitted on a main optical network by selecting an optical wavelength and carrier signal frequency, further being relocated by frequency-conversion to transmit to a subordinate optical network. In use of such repeater node, a device for selecting an optical wavelength is not needed in respective optical terminals. Also, an optical loss in the distribution of a signal light can be compensated by the repeater node.

BRIEF DESCRIPTION OF THE DRAWINGS

The invention will be explained in more detail in conjunction with the appended drawings, wherein.

DESCRIPTION OF THE PREFERRED EMBODIMENTS

Figures 1, 2:
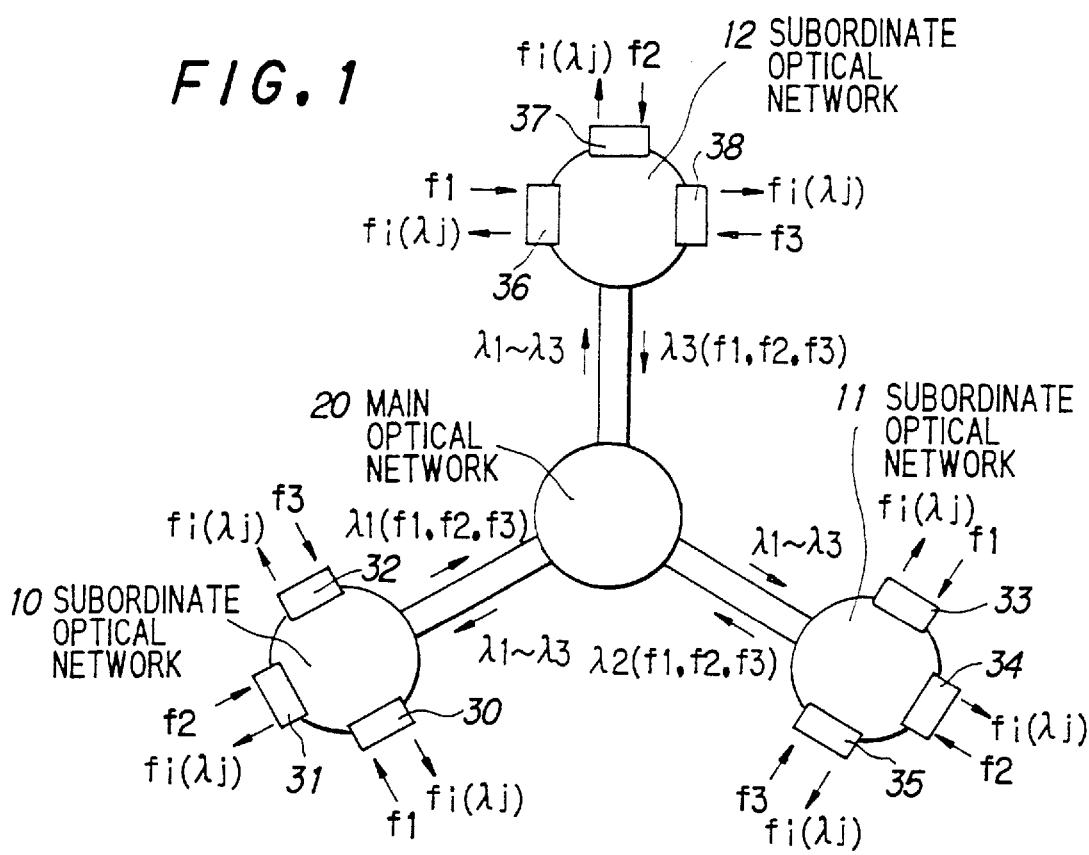
FIG. 1 is a schematic diagram showing a basic composition of an optical network according to the invention.
FIG. 2 is a table showing a wavelength and carrier frequency assigned to respective optical terminals.

FIG. 1 shows a basic schematic composition of an optical network according to the invention. Subordinate optical networks 10 to 12 are connected with a main optical network 20, and optical terminals 30–32, 33–35 and 36–38 are connected with the corresponding subordinate optical network 10 to 12. In the subordinate optical networks 10 to 12, the multiplexing or demultiplexing of a transmission signal or reception signal from the optical terminals is carried out by using the subcarrier multiplexing(SCM). In the main optical network 20, signal lights from the subordinate optical networks are multiplexed by the wavelength division multiplexing(WDM).

The optical terminals 30 to 32 of the subordinate optical network 10 transmit signal lights which are modulated with the a respective frequencies f1 to f3 assigned thereto. A wavelength $\lambda 1$ is assigned to a signal light which is transmitted from the subordinate optical network 10 to the main optical network 20, wherein the signal light is modulated with carrier signal with frequencies f1 to f3. Similarly, signal lights with wavelengths $\lambda 2$ and $\lambda 3$, respectively which are modulated with carrier signals with frequencies f1 to f3 are transmitted from the subordinate optical networks 11 and 12 to the main optical network 20. Herein, an optical wavelength and carrier frequency as shown in FIG. 2 are assigned to the respective optical terminals.

The signal lights with wavelengths $\lambda 1$ to $\lambda 3$ are multiplexed in the main optical network 20 and are distributed to the subordinate optical networks 10 to 12. In each of the optical terminals, a signal light wavelength $\lambda j(j=1,2,3)$ and carrier frequency $fi(i=1,2,3)$ are selected to get a desired carrier signal.

Figure 3:
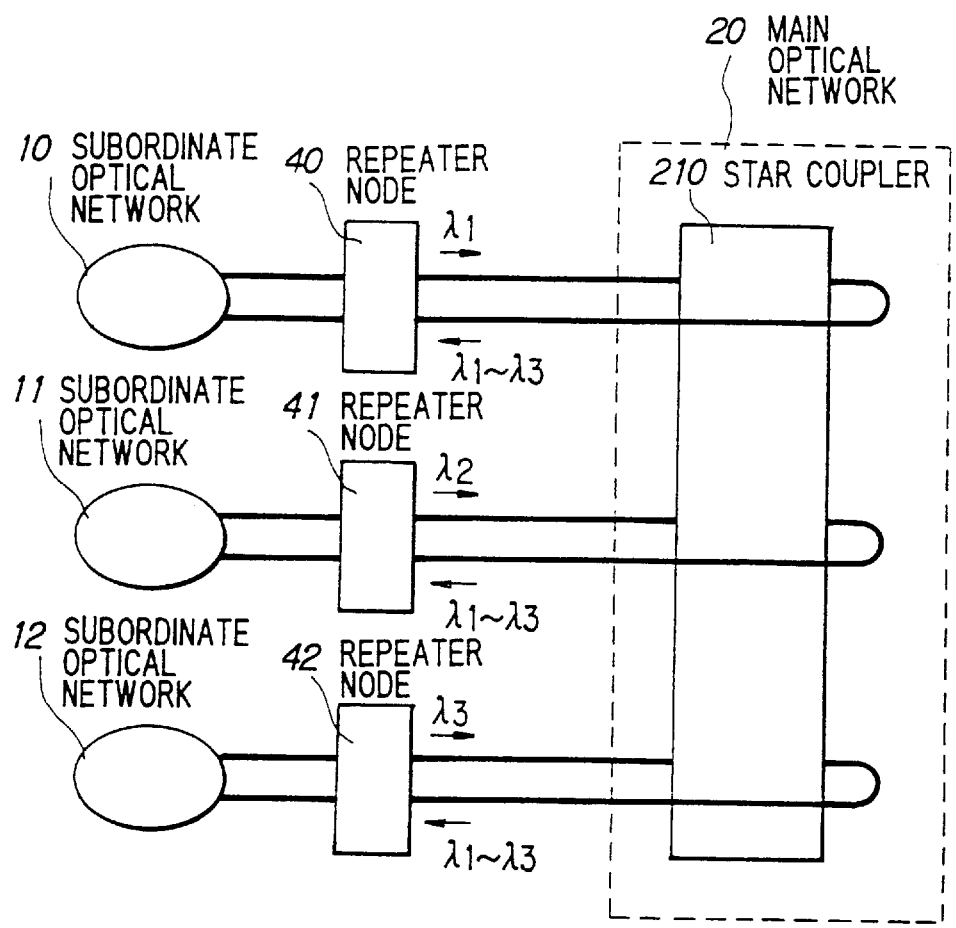
FIG. 3 is a schematic diagram showing an optical network in a first preferred embodiment according to the invention.

FIG. 3 shows a network composition of a first preferred embodiment of the invention. The subordinate optical networks 10 to 12 are connected to the main optical network 20 through repeater nodes 40 to 42. The main optical network 20 is composed of a star coupler 210 which has three input ports and three output ports. Signal lights to which optical wavelengths $\lambda 1$ to $\lambda 3$ are assigned are transmitted from the repeater nodes 40 to 42 to the main optical network 20, then they are coupled and divided in the star coupler 210 and are transmitted to the respective repeater nodes.

Figure 4:
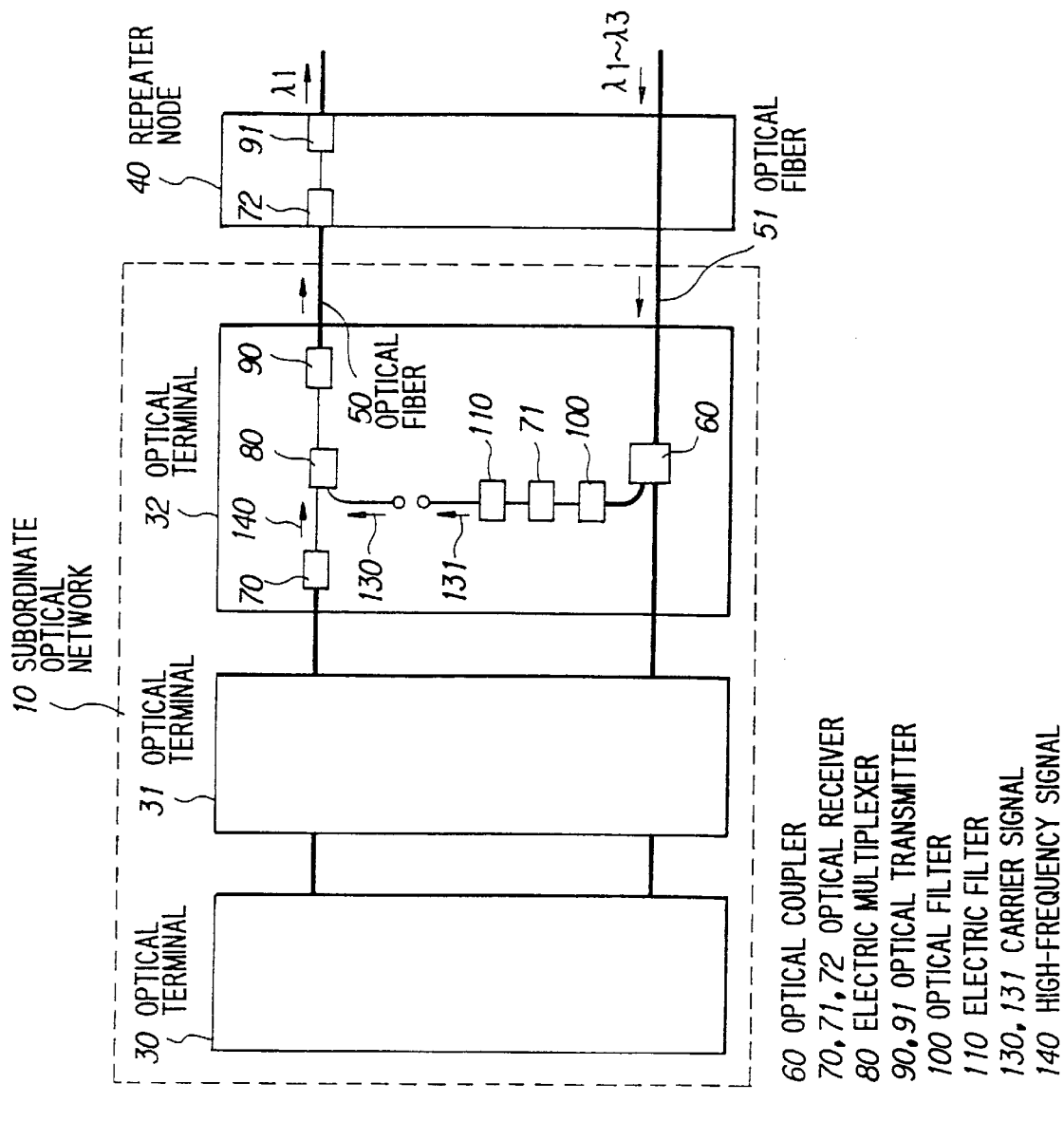
FIG. 4 is a partially detailed diagram showing a subordinate optical network and repeater node in the first embodiment.

FIG. 4 shows a detailed composition of the subordinate optical network 10 and repeater node 40. The subordinate optical network 10 comprises optical terminals 30 to 32 which are cascaded along optical fiber transmission lines 50 and 51 which originates and terminates at the repeater node 40. The carrier frequencies f1 to f3 are assigned to the optical terminals 30 to 32.

In this embodiment, subcarrier multiplexing repeaters are employed as a multiplexing manner of a signal transmitted from an optical terminal. In the optical terminal 32, an optical receiver 70 receives a signal light transmitted from the optical terminal 31 and then outputs a high-frequency signal 140. An optical transmitter 90 transmits a signal light which is modulated with a high-frequency signal in which the high-frequency signal 140 and a carrier signal 130 with frequency f3 is multiplexed by an electric multiplexer 80. In this manner, only one signal light is transmitted between the optical terminals. Therefore, since the wavelength of a signal light is not limited, a low-cost light source can be used. The subcarrier multiplexing repeaters is in detail reported in, for example, W. Domon et al., "An Optical Multiple-Access Network Using Subcarrier Multiplexing Repeaters", Technical Report of the Institute of Electronics Information and Communication Engineers, OCS93-99 (1994). The signal light transmitted from the optical terminal 32 is converted into a signal light with wavelength λ1 by the repeater node 40 which comprises an optical receiver 72 and optical transmitter 91.

The signal light with wavelengths λ1 to λ3 which is transmitted from the main optical network,10 to the repeater node 40 is transmitted on an optical fiber transmission line 51 as it is. In the optical terminal 32, a part of the signal light is divided at an optical coupler 60, being filtered by an optical filter to select a signal light with a desired wavelength, then being received by an optical receiver 71. Further, from the output signal of the optical receiver 71, a desired carrier signal 131 is selected by an electric filter.

In this embodiment, three optical wavelengths of λ1, λ2 and λ3 which are 1.53, 1.55 and 1.57 μm, respectively and three carrier frequencies of f1, f2 and f3 which are 500, 600 and 700 MHz, respectively are employed. The length of a transmission line between the respective optical terminals is 20 km, and thus the large-scale subordinate optical networks with a total transmission distance of 60 km is realized. The number of optical fiber transmission lines for the subordinate optical networks is two. The transmission lines can be sufficiently used.

In the first embodiment, the signal light with wavelength λ1 is transmitted from the repeater node 40. However, the signal light with wavelength λ1 may be directly transmitted from the optical terminal 32 to the main optical network 10. The optical terminal 32 can function as a repeater node, then the repeater node 40 is not needed.

Further, though the signal light with wavelengths λ1 to λ3 transmitted from the main optical network 10 is transmitted to the subordinate optical network 10 through the repeater node 40 as it is, the repeater node 40 or optical fiber transmission line 51 may include an optical amplifier for compensating a transmission loss or a division loss at the optical coupler. In that case, the optical amplifier is needed to simultaneously amplify a plurality of signal lights with different wavelengths. For example, an optical amplifier for the simultaneous amplifying of a multi-wavelength signal light is shown in M. Misono et al., "Er-Doped Fiber Amplifier for WDM Networks Using Automatic Gain Control", The Institute of Electronics Information and Communication Engineers, Autumn Meeting, B-943(1994).

Figure 5:
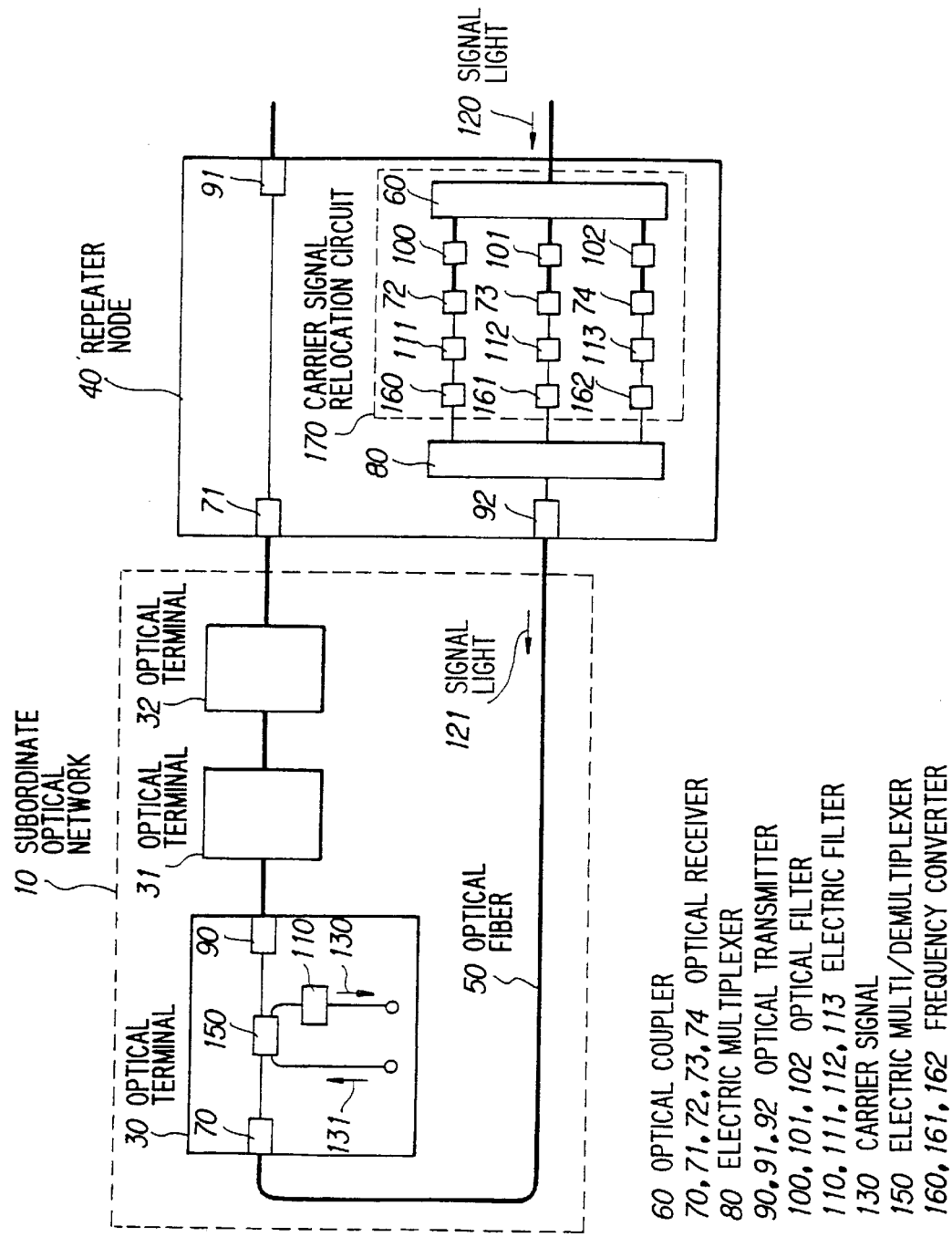
FIG. 5 is a partially detailed diagram showing a subordinate optical network and repeater node in a second preferred embodiment according to the invention.

FIG. 5 shows a subordinate optical network 10 and repeater node 40 of an optical network in a second preferred embodiment, and the whole composition thereof is similar to that in the first embodiment as shown in FIG. 3. In the second embodiment, a repeater node 40 employs a carrier signal relocation circuit, and a bi-directional optical transmission between the repeater node and optical terminals are performed on a optical fiber transmission line. In a subordinate optical network 10, the optical terminals 30 to 32 are cascaded on a loop-shaped optical fiber transmission line 50 which originates and terminates at the repeater node 40. This embodiment also employs subcarrier multiplexing repeaters.

A signal light 120 with wavelengths λ1 to λ3 which is transmitted from the main optical network 10 is input to a carrier signal relocation circuit 170 in the repeater node 40. The carrier signal relocation circuit 170 comprises an optical coupler 60, optical filters 100 to 102, optical receivers 72 to 74, electric filters 111 to 113 and frequency converters 160 to 162. The carrier signal relocation circuit 170 extracts carrier signals which will be received by the optical terminal by the optical filters 100 to 102 with a variable wavelength pass band and the electric filters 111 to 113 with a variable frequency pass band, further converting the frequency of the extracted carrier signals by the frequency converters 160 to 162 to relocate them as desired frequency bands.

The carrier signals output from the carrier signal relocation circuit 170 are multiplexed in an electric multiplexer 80 and then are input to an optical transmitter 92. From the optical transmitter 92, a signal light 121 modulated by these carrier signals is transmitted to an optical fiber transmission line 50.

In an optical terminal 30, a part of a high-frequency signal output from an optical receiver 70 which receives the signal light 121 is demultiplexed at an electric multi/demultiplexer 150, then the demultiplexed signal is passed through an electric filter 110 to obtain a desired carrier signal 130. The high-frequency signal output from the optical receiver 70 is multiplexed with a carrier signal 131 by the electric multi/demultiplexer 150 and is then transmitted from an optical transmitter 90 to the other optical terminal. Thus, the other optical terminal can get a desired carrier signal.

Figure 6:
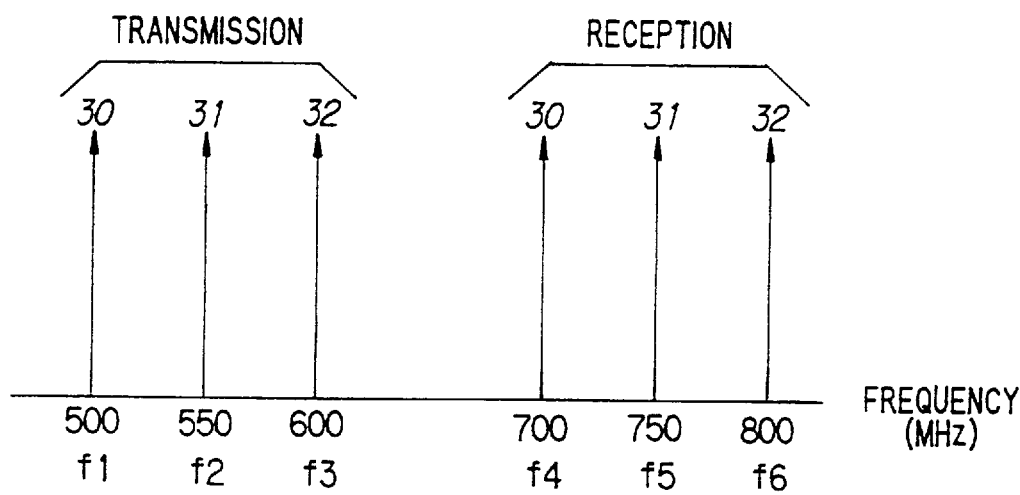
FIG. 6 is a chart showing transmitted or received carrier signals assigned to respective optical terminals.

In this embodiment, as shown in FIG. 6, the frequencies of f1, f2 and f3 of carrier signals which are transmitted from the optical terminals 30 to 32 are 500, 550 and 600 MHz, respectively and the frequencies of f4, f5 and f6 of carrier signals which are received by the optical terminals 30 to 32 are 700, 750 and 800 MHz, respectively. The carrier signals to be received by the optical terminals 30 to 32 are relocated to the frequencies f4 to f6 in the repeater node 40 and are then transmitted to the subordinate optical network 10 to be received by the respective optical terminals.

Figure 7:
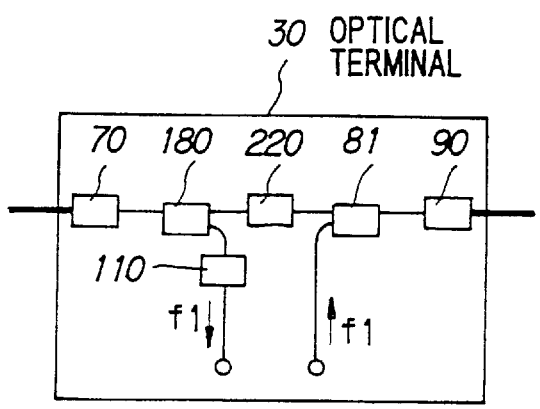
FIG. 7 is a partially detailed diagram showing another optical terminal in the second embodiment.

The frequencies of carrier signals which are transmitted and received at the respective optical terminals may be common by a drop-insert type optical terminal as shown in FIG. 7. A carrier frequency f1 is assigned to the optical terminal 30. In the optical terminal 30, the reception of a carrier signal is carried out such that a carrier signal with a frequency f1 is extracted from a high-frequency signal output from the optical receiver 70 by the electric filter 110. On the other hand, the transmission of a carrier signal is carried out such that the high-frequency signal output from the optical receiver 70 is passed through a notch filter 220 which removes only the carrier signal with a frequency f1 then multiplexing a carrier signal in the vacant frequency band. Thus, the electric frequency band can be reduced to one half due to the common frequency of the carrier signal by the optical terminal which has the drop-insert function.

Figure 8:
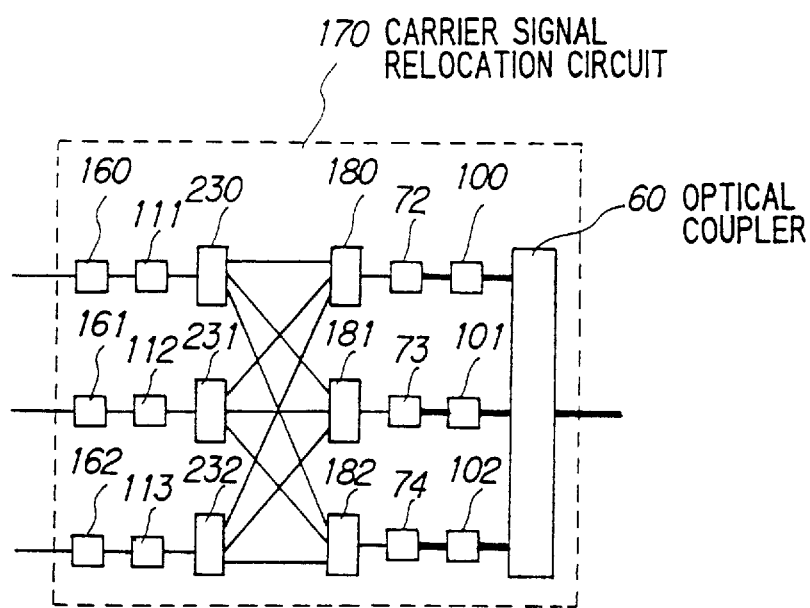
FIG. 8 is a partially detailed diagram showing another carrier signal relocation circuit in the second embodiment.

Alternatively, the carrier signal relocation circuit 170 may include a fixed wavelength optical filter and an electric switch as shown in FIG. 8. The carrier signal relocation circuit 170 comprises an optical coupler 60, optical filters 100 to 102, optical receivers 72 to 74, electric demultiplexers 180 to 182, electric switches 230 to 232, electric filters 111 to 113 and frequency converters 160 to 162. The wavelength pass band of the optical filters 100 to 102 is fixed, and all signal lights are converted into high-frequency signals by the optical receivers 72 to 74. The high-frequency signals are demultiplexed by the electric demultiplexers 180 to 182 and are then input to the electric switches 230 to 232. The respective electric switches 230 to 232 output any one of the high-frequency signals input. Namely, the electric switch functions as a selector of the signal light. The frequencies of the carrier signals which are extracted from the high-frequency signals output from the electric switches by the electric filters 111 to 113 are converted by the frequency converters 160 to 162 to relocate in a desired frequency band. When wavelength-multiplexed signal lights are input, the optical coupler 60 and optical filters 100 to 102 may be replaced by an optical demultiplexer in which a signal light with a different wavelength is output from a different port. Such optical demultiplexer is, for example, shown in S. Suzuki et al., "High-Density Integrated 1×16 Optical FDM Multi/Demultiplexer Using High-Δ SiO2-GeO2 Waveguides on Silicon", The Institute of Electronics Information and Communication Engineers, Autumn Meeting, C-257(1994).

Figure 9:
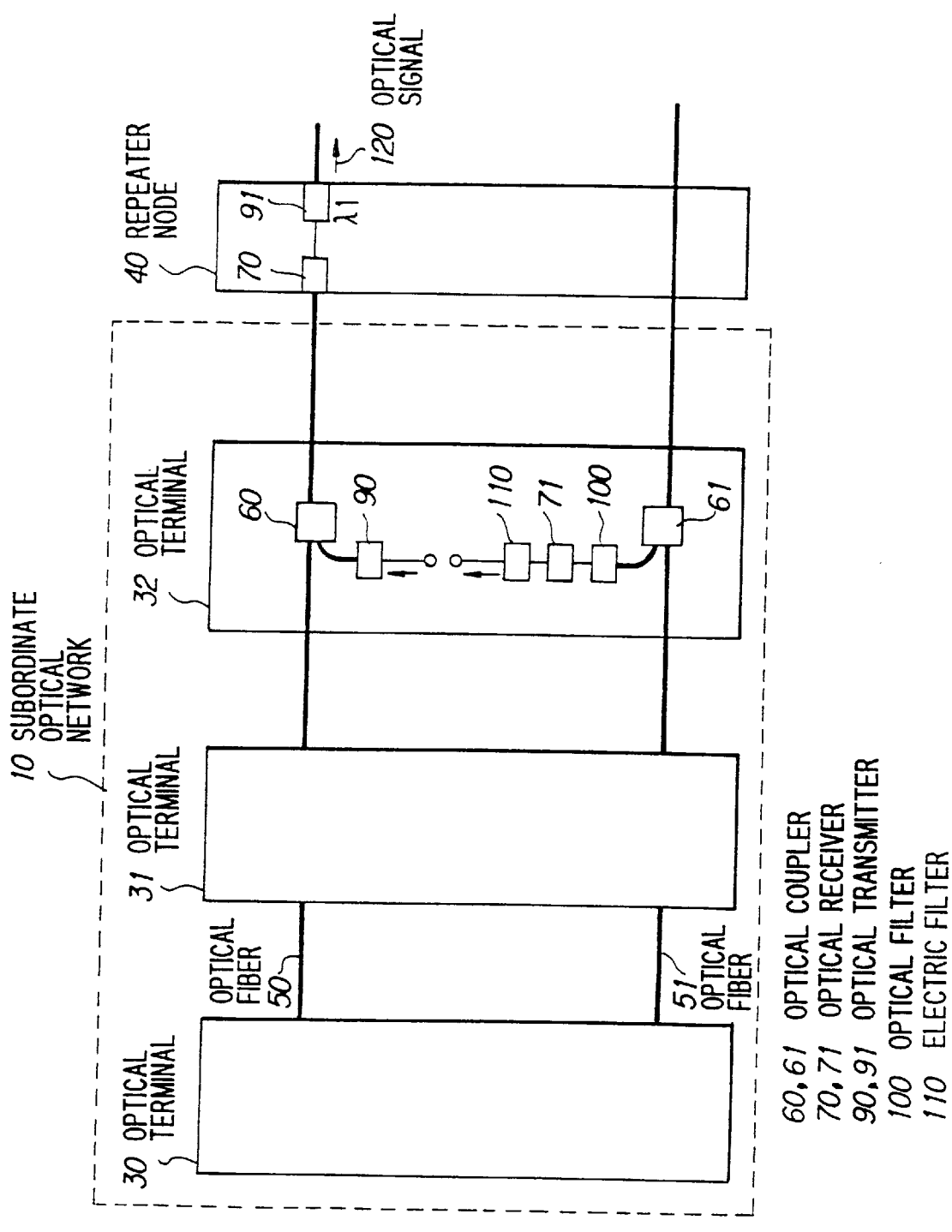
FIG. 9 is a partially detailed diagram showing a subordinate optical network and repeater node in a third preferred embodiment according to the invention.

FIG. 9 shows a subordinate optical network 10 and repeater node 40 of an optical network in a third preferred embodiment, and the whole composition thereof is similar to that in the first embodiment as shown in FIG. 3. In the third embodiment, signal lights transmitted from the respective optical terminals are multiplexed on the optical fiber transmission line. In the subordinate optical network 10, optical terminals 30 to 32 are connected by the optical transmission lines 50, 51. In the optical terminal 32, an optical coupler 60 connected with an optical transmitter 90 which transmits a signal light is inserted on the optical fiber transmission line 50. The signal light transmitted from the optical transmitter 90 is multiplexed with a signal light transmitted from the optical terminal 31 by the optical coupler 60.

In the repeater node 40, beat noise due to the interference of the signal lights may be generated in an optical receiver 70 since all the signal lights transmitted from the optical terminals 30 to 32 are simultaneously received by the optical receiver 70. When the beat noise is generated in the carrier signal frequency band, noise characteristics are significantly degenerated. In this embodiment, the wavelengths of the respective signal lights are controlled not to be overlapped each other. Such beat noise is, for example, explained in M. Shibutani et al., "Optical Transmission Networks for Wide Area Video Monitoring Systems", Technical Report of The Institute of Electronics Information and Communication Engineers, OCS9225(1992).

The signal light transmitted from the respective optical terminals is converted into a signal light with a wavelength λ1 which is assigned to the subordinate optical network 10 in the repeater node 40 and are then transmitted to the main optical network 20. Thus, in this embodiment, since the wavelength of the signal light is converted into a wavelength assigned to the respective subordinate optical networks in the repeater node, with an optional wavelength can be used in the subordinate optical network.

Figure 10:
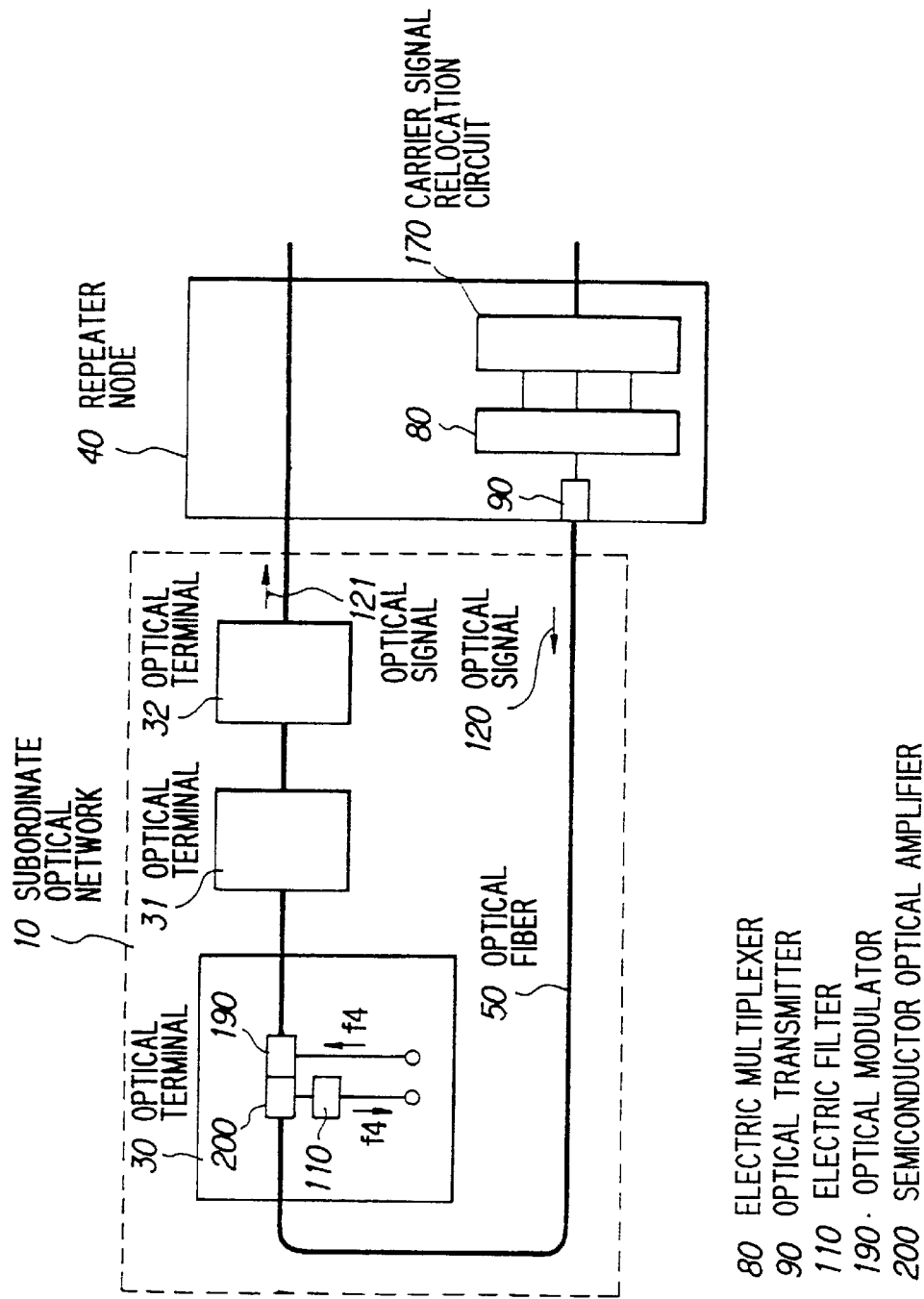
FIG. 10 is a partially detailed diagram showing a subordinate optical network and repeater node in a fourth preferred embodiment according to the invention.

FIG. 10 shows a subordinate optical network 10 and repeater node 40 of an optical network in a fourth preferred embodiment, and the whole composition thereof is similar to that in the first embodiment as shown in FIG. 3. In the subordinate optical network 10, optical terminals 30 to 32 are connected by a loop-type optical fiber transmission line 50. In this embodiment, the frequencies of transmission carrier signals of f1, f2 and f3 and frequencies of reception carrier signals of f4, f5 and f6 are assigned to the optical terminals 30 to 32.

In the fourth embodiment, cascaded optical modulators are employed to multiplex a signal light transmitted from an optical terminal. In the optical terminal 30, a carrier signal with a frequency f1 is applied to an optical modulator 190. A signal light 120 is modulated by the carrier signal when it passes through the optical modulator 190. When passing through the other optical terminal, the signal light is similarly modulated. Namely, the signal light 121 output from the optical terminal 32 is modulated by the carrier signals with wavelengths f1 to f3. The composition of the cascaded optical modulators is, for example, shown in W. Domon et al., "SCM Optical Multiple-Access Networks with Cascaded Optical Modulators", The Institute of Electronics Information and Communication Engineers, Spring Meeting, SB-9-4(1993).

In this embodiment, the carrier signals received by the respective optical terminals are converted into those with frequencies f4 to f6 in the repeater node 40 similarly to the second embodiment as shown in FIG. 2, thereafter being transmitted to the subordinate optical network 10. The respective optical terminals include semiconductor optical amplifiers 200 to compensate the insertion loss of the optical modulator, wherein the semiconductor optical amplifier 200 also functions as an optical receiver as well as an amplifier. In the optical terminal 30, a high-frequency signal output from the semiconductor optical amplifier 200 is passed through an electric filter 110 to obtain a carrier signal with a frequency f4. The semiconductor optical amplifier is, for example, shown in K. T. Koai et al., "Simultaneous Optical Amplification, Detection, and Transmission Using In-Line Semiconductor Laser Amplifiers", IEEE Photonics Technology Letters, Vol.4, No.5, pp.441–443(1992).

In the repeater node 40, the signal light transmitted from the optical transmitter 90 may be directly transmitted to a WDM network when a wavelength thereof is that assigned to the subordinate optical network. In this case, the optical receiver and optical transmitter which convert the wavelength of a signal light from the subordinate optical network and transmit to the main optical network are not needed in the repeater node.

Figure 11:
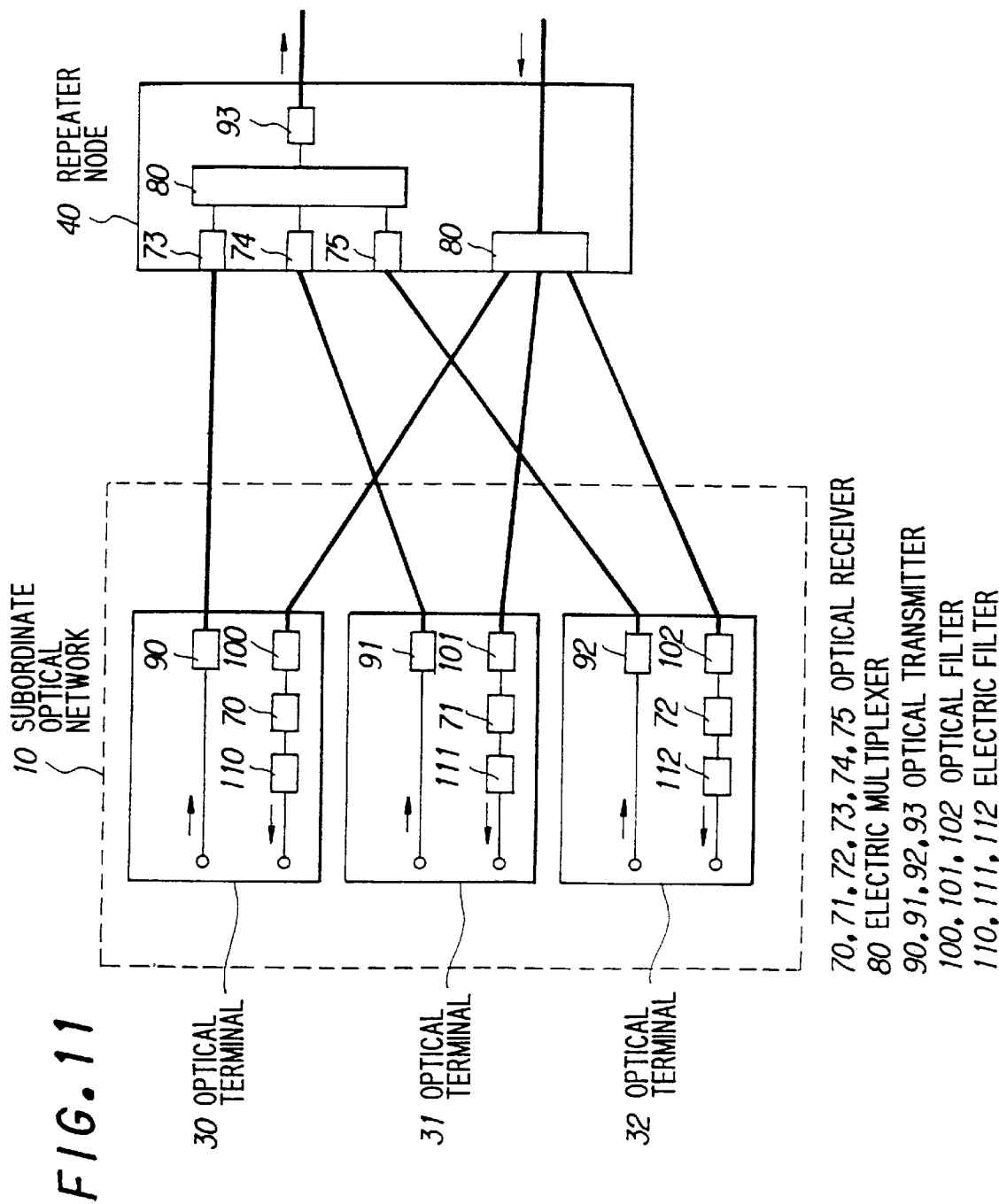
FIG. 11 is a partially detailed diagram showing a subordinate optical network and repeater node in a fifth preferred embodiment according to the invention.

FIG. 11 shows a subordinate optical network 10 and repeater node 40 of an optical network in a fifth preferred embodiment, and the whole composition thereof is similar to that in the first embodiment as shown in FIG. 3. In this embodiment, optical terminals and repeater node are connected by a single-star type optical fiber transmission line. There are two optical fiber transmission lines between each of the optical terminals 30 to 32 in the subordinate optical network 10 and the repeater node 40. Three signal lights transmitted from the respective optical terminals are modulated by carrier signals with frequencies different with each other. Each of the signal lights is transmitted on the optical fiber transmission line different with each other, being converted into with a wavelength λ1 in the repeater node 40 and transmitted to the main optical network 20. Thus, in this embodiment, since a plurality of carrier signals is not multiplexed, optical transmitter 90 to 92 can employ even a cheap light source which does not have a good distortion property and is not easily modulated by a plurality of carrier signals.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical network, comprising:
   a plurality of subordinate optical networks, each subordinate optical network comprising at least one optical terminal which transmits and receives signals comprising signal light, wherein multiplexing of transmitted signals and demultiplexing of received signals at said at least one optical terminal is carried out in the subcarrier multiplexing manner; and
   a main optical network connected with said subordinate optical networks, wherein multiplexing of signals transmitted from said subordinate optical networks is carried out in the wavelength division multiplexing manner.

2. The optical network of claim 1, wherein:
   each optical terminal further comprises an optical receiver receiving said signals comprising signal light and outputting high frequency electric signals, an optical transmitter transmitting said signals comprising signal light in accordance with high frequency electric signals input to said optical transmitter, and an electric multiplexer multiplexing said high frequency electric signals and a carrier signal to said optical transmitter;
   at least one of said subordinate optical networks comprises a first plurality of optical terminals cascaded on an optical fiber transmission line, carrier signals with frequencies different from each other being input to said plurality of optical terminals in said at least one subordinate optical network; and
   said optical receiver in a first optical terminal of said first plurality of optical terminals receives a signal light transmitted from a second cascaded optical terminal, said carrier signal input to said first optical terminal and said high-frequency signal output from said optical receiver of said first optical terminal are multiplexed by said electric multiplexer so as to input a high-frequency signal to said optical transmitter thereby modulating said signal light transmitted from said second optical terminal.

3. The optical network of claim 1, wherein each of said plurality of subordinate optical networks comprises a plurality of optical terminals, said plurality of optical terminals of said subordinate optical networks transmit signal lights modulated by carrier signals with frequencies different from each other, and said transmitted signal lights are multiplexed on an optical fiber transmission line.

4. The optical network of claim 1, wherein:
   at least one of said subordinate optical networks comprises a first Plurality of optical terminals cascaded on an optical fiber transmission line which originates at an optical transmitter; and
   each of said first plurality of optical terminals includes an optical modulator in which carrier signals with frequencies different from each other are applied, such that a signal light transmitted from a first optical terminal of said first plurality of optical terminals is modulated by said optical modulator, and a signal light received by a second optical terminal is that which is transmitted by said first optical terminal modulated by said optical modulator.

5. The optical network of claim 1, wherein said subordinate optical networks and said main optical network are connected through a repeater node.

6. The optical network of claim 5, wherein said repeater node comprises:
   an optical receiver for receiving a signal light from said subordinate optical network; and
   an optical transmitter for transmitting a signal light modulated with a high-frequency signal output from said optical receiver to said main optical network;
   wherein a wavelength corresponding to said repeater node is assigned to said signal light transmitted from said optical transmitter.

7. The optical network of claim 5, wherein said repeater node comprises:
   an optical filter selecting a signal light having a desired wavelength from a plurality of signal lights with wavelengths different from each other, said selected signal light being transmitted from said main optical network;
   an optical receiver receiving said signal light selected by said optical filter;
   an electric filter selecting a carrier signal of a desired frequency from a high-frequency signal output of said optical receiver;
   an electric frequency converter converting a frequency of said carrier signal selected by said electric filter; and
   an optical transmitter transmitting a signal light modulated with a carrier signal output from said frequency converter to said subordinate optical network.

8. An optical network, comprising:
   a plurality of subordinate optical networks, each of which being connected with a plurality of optical terminals which function as a transmitter and a receiver of a signal light, wherein multiplexing of transmission signals and demultiplexing of reception signals at said optical terminals are carried out in the subcarrier multiplexing manner, said optical terminals of number N (N is a natural number of two or more) which are connected with each of said subordinate optical network are cascaded on a optical fiber transmission line; and
   a main optical network which is connected with said subordinate optical networks, wherein multiplexing of signal lights transmitted from said subordinate optical networks is carried out in the wavelength division multiplexing manner, wherein carrier signals with frequencies different with each other are input to said optical terminals, an optical receiver in an optical terminal number K (K is a natural number of two or more and N or less) receives a signal light transmitted from a optical terminal number K–1, a carrier signal input to said optical terminal number K and a high-frequency signal output from said optical receiver are multiplexed by an electric multiplexer and a high-frequency signal is then applied to an optical transmitter thereby modulating a signal light transmitted from said optical terminal number K.

9. An optical network, comprising:
   a plurality of subordinate optical networks, each of which being connected with a plurality of optical terminals which function as a transmitter and a receiver of a signal light, wherein multiplexing of transmission signals and demultiplexing of reception signals at said optical terminals are carried out in the subcarrier multiplexing manner, said optical terminals of number N (N is a natural number of two or more) which are connected with each of said subordinate optical network are cascaded on a optical fiber transmission line which is originated from an optical transmitter; and a main optical network which is connected with said subordinate optical networks, wherein multiplexing of signal lights transmitted from said subordinate optical networks is carried out in the wavelength division multiplexing manner, wherein each of said optical terminals has an optical modulator in which carrier signals with frequencies different with each other are applied, a signal light transmitted from a first optical terminal is that which is transmitted from said optical transmitter and modulated by said optical modulator, and a signal light transmitted from an optical terminal number K (K is a natural number of two or more and N or less) is that which is transmitted from an optical terminal number K−1 and modulated by said optical modulator.

\* \* \* \* \*

UNITED STATES PATENT AND TRADEMARK OFFICE
CERTIFICATE OF CORRECTION

PATENT NO. : 5,847,852
DATED : December 8, 1998
INVENTOR(S) : Wataru Domon et al.

It is certified that error appears in the above-identified patent and that said Letters Patent is hereby corrected as shown below:

On the title page of the patent:

At Item [62], change "Division of Ser. No. 573,321, Dec. 15, 1995, abandoned." to read --Division of Ser. No. 573,321. Dec. 15, 1995, Pat. 5,771,111.

Column 1, line 4, change "now abandoned" to read --now U.S. Patent No. 5,771,111, issued Jun. 23,1998--

Signed and Sealed this

Third Day of August, 1999

Attest:

Q. TODD DICKINSON

Attesting Officer

Acting Commissioner of Patents and Trademarks